(12) United States Patent
Sedayao (10) Patent No.: US 10,833,933 B2
(45) Date of Patent: Nov. 10, 2020

(54) SYSTEMS AND METHODS FOR OPTIMIZING A CLOUD DEPLOYED SERVICE BASED ON PERFORMANCE METRICS OF THE CLOUD SERVICE

(71) Applicant: Intel Corporation, Santa Clara, CA (US)

(72) Inventor: Jeffrey Christopher Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 16/145,769

(22) Filed: Sep. 28, 2018

(65) Prior Publication Data

US 2019/0044806 A1 Feb. 7, 2019

(51) Int. Cl.
*G06F 15/173* (2006.01)
*H04L 12/24* (2006.01)
*G06F 9/50* (2006.01)
*H04L 12/26* (2006.01)
*G06F 11/30* (2006.01)

(52) U.S. Cl.
CPC ........ *H04L 41/0823* (2013.01); *G06F 9/5072* (2013.01); *G06F 9/5077* (2013.01); *H04L 41/14* (2013.01); *H04L 41/5054* (2013.01); *H04L 43/04* (2013.01); *H04L 43/08* (2013.01); *H04L 43/0817* (2013.01); *G06F 11/301* (2013.01); *H04L 41/5041* (2013.01)

(58) Field of Classification Search
CPC . H04L 41/0823; H04L 43/08; H04L 41/5054; H04L 43/0817; H04L 43/04; H04L 41/5041; H04L 41/14; G06F 9/5072; G06F 9/5077; G06F 11/301
USPC ............... 709/220, 221, 222, 223, 224, 226
See application file for complete search history.

(56) References Cited

U.S. PATENT DOCUMENTS

| 2011/0307291 A1* | 12/2011 | Rolia | G06Q 10/06 705/7.25 |
| 2011/0307412 A1* | 12/2011 | Rolia | G06Q 10/06 705/348 |
| 2012/0151474 A1* | 6/2012 | Biran | G06F 9/45558 718/1 |

(Continued)

*Primary Examiner* — Liang Che A Wang
*Assistant Examiner* — Johnny B Aguiar
(74) *Attorney, Agent, or Firm* — Schwegman Lundberg & Woessner, P.A.

(57) ABSTRACT

Various systems and methods for managing container and virtual machine locations for a cloud deployed service are described herein. A system includes a configuration generator to: obtain a plurality of constraints from a constraint database; generate a plurality of configuration plans, each of the plurality of configuration plans including the plurality of constraints, each of the plurality of constraints having a value selected from a range of permissible values for the respective constraint; and transmit the plurality of configuration plans to an orchestrator system, the orchestrator system to sequentially instantiate a cloud service based on multiple configuration plans of the plurality of configuration plans; and a performance evaluator to: measure a performance metric of the cloud service as instantiated by each of the multiple configuration plans; and coordinate with the orchestrator system to optimize the performance of the cloud service.

16 Claims, 6 Drawing Sheets (56) References Cited

U.S. PATENT DOCUMENTS

2015/0302440 A1* 10/2015 Monden ............. G06Q 30/0206
                                                        705/7.35
2017/0257424 A1*  9/2017 Neogi ................ H04L 43/16
2017/0315902 A1* 11/2017 Moretto ............. G06F 11/3672
2018/0287864 A1* 10/2018 Hockett ............. H04L 41/082
2019/0138287 A1*  5/2019 De Capoa ........... G06F 8/64

* cited by examiner

| CONSTRAINT | VALUE |
|---|---|
| HOSTS | 1-4 |
| LATENCY | 5-12 MS |
| BANDWIDTH | 0.5-10 MBPS |
| CO-LOCATION | C1 AND C2 |

*FIG. 3*

| CONSTRAINT | PLAN A | PLAN B | PLAN C | ... | PLAN N |
|---|---|---|---|---|---|
| HOSTS | 1 | 2 | 3 | ... | 3 |
| LATENCY | 5 MS | 5 MS | 5 MS | ... | 12 MS |
| BANDWIDTH | 0.5 MBPS | 0.5 MBPS | 0.5 MBPS | ... | 10 MBIT |
| CO-LOCATION | C1 AND C2 | C1 AND C2 | C1 AND C2 | ... | C1 AND C2 |

*FIG. 4*

| PLAN | PERFORMANCE |
|---|---|
| PLAN A | 5 MS |
| PLAN B | 4.5 MS |
| PLAN C | 6 MS |
| ... | ... |
| PLAN N | 8 MS |

SYSTEMS AND METHODS FOR OPTIMIZING A CLOUD DEPLOYED SERVICE BASED ON PERFORMANCE METRICS OF THE CLOUD SERVICE

TECHNICAL FIELD

Embodiments described herein generally relate to cloud-based systems, and in particular, to systems and methods for managing a cloud deployed service.

BACKGROUND

Virtual machines (VMs) and Containers are used for implementing services in public, private, and hybrid clouds. A virtual machine is used to emulate hardware, or combinations of hardware and software. One or more virtual machines may be executed on an underlying real-world hardware platform, referred to as a host. Containers are similar to VMs, but are more lightweight components. Instead of virtualizing an entire operating system and software execution environment, a container sits on top of the host's operating system and shares the host's operating system with other containers. In a data center environment there may be tens or hundreds or even thousands of hosts, each executing multiple VMs or containers. A management platform may be used to manage the VMs or containers that are installed in the data center.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

In a virtualized computing environment, a physical machine is configured to implement the behavior of a virtual machine. The physical machine, often referred to as a "host" or "physical host", may be configured using software to implement multiple virtual machines (VMs), also referred to as "virtual hosts."

A physical machine typically includes physical system hardware that typically includes one or more physical processors (PCPUs), physical memory, and various other physical devices, such as local storage and TO, for example. A virtual machine typically includes virtual system hardware that ordinarily includes one or more virtual CPUs (VCPUs), virtual memory, virtual storage, virtual input/output (IO), and one or more other virtual devices, all of which may be implemented in software using known techniques to emulate corresponding physical components. A VM typically will include both virtual system hardware and guest system software including virtual drivers used for various virtual devices. One or more layers or co-resident software components comprising a virtualization intermediary, e.g. a virtual machine monitor (VMM), act to instantiate and provision VMs and to allocate host machine resources dynamically and transparently among the multiple VMs so that their respective guest operating systems may each run multiple VCPUs concurrently on a single physical machine.

The location of where VMs and containers are instantiated have a tremendous impact on performance and security. For instance, two VMs/containers that frequently communicate should be placed together for better performance while two VMs/containers that interfere with each other (e.g., try and use the same resources at the same time) should not be on the same physical server. Other VMs/containers may be best isolated in environments that use full virtualization, such as Intel Clear Containers and Kata Containers. Other optimizations, such as co-compilation of containers that communicate frequently, are not effective unless containers are on the same physical host.

In some conventional systems, container placement is controlled by directives that specify rack preferences, data center preferences, and region preferences. The directives may enumerate or specify the environment or types of environment to instantiate a container or VM (e.g., such as to not place a container in a development environment for a production system). Other directives may seek to minimize power utilization, maximize resource utilization, or meet service level agreements (SLAs). However, declaring placement requirements for VMs and containers, while useful, does not help determine the best placement requirements in the first place. Further, declaring placement requirements using static directives does not provide insight into how such placements may perform in real-world conditions or provide a feedback loop to improve performance. What is needed is an improved monitoring platform that analyzes the organization of VMs or containers and relocates VMs or containers to achieve better performance.

Described herein are systems and methods for optimizing the placement of containers to maximize the security and performance of containers or VMs when deployed for a service. The systems and methods also provide for monitoring performance to continuously improve the service and create knowledge about optimal and suboptimal configurations. A framework is provided that discovers the optimal VM or container placement by continuously monitoring an existing VM or container layout to determine improvements or validate assumptions. The framework includes a configuration database with performance data, a testing engine to test possible layouts of VMs or containers for a service, and a monitoring engine that generates service performance data of layouts. The framework improves the functionality of data center computers and services deployed within containers or VMs on the computers.

Figure 1:
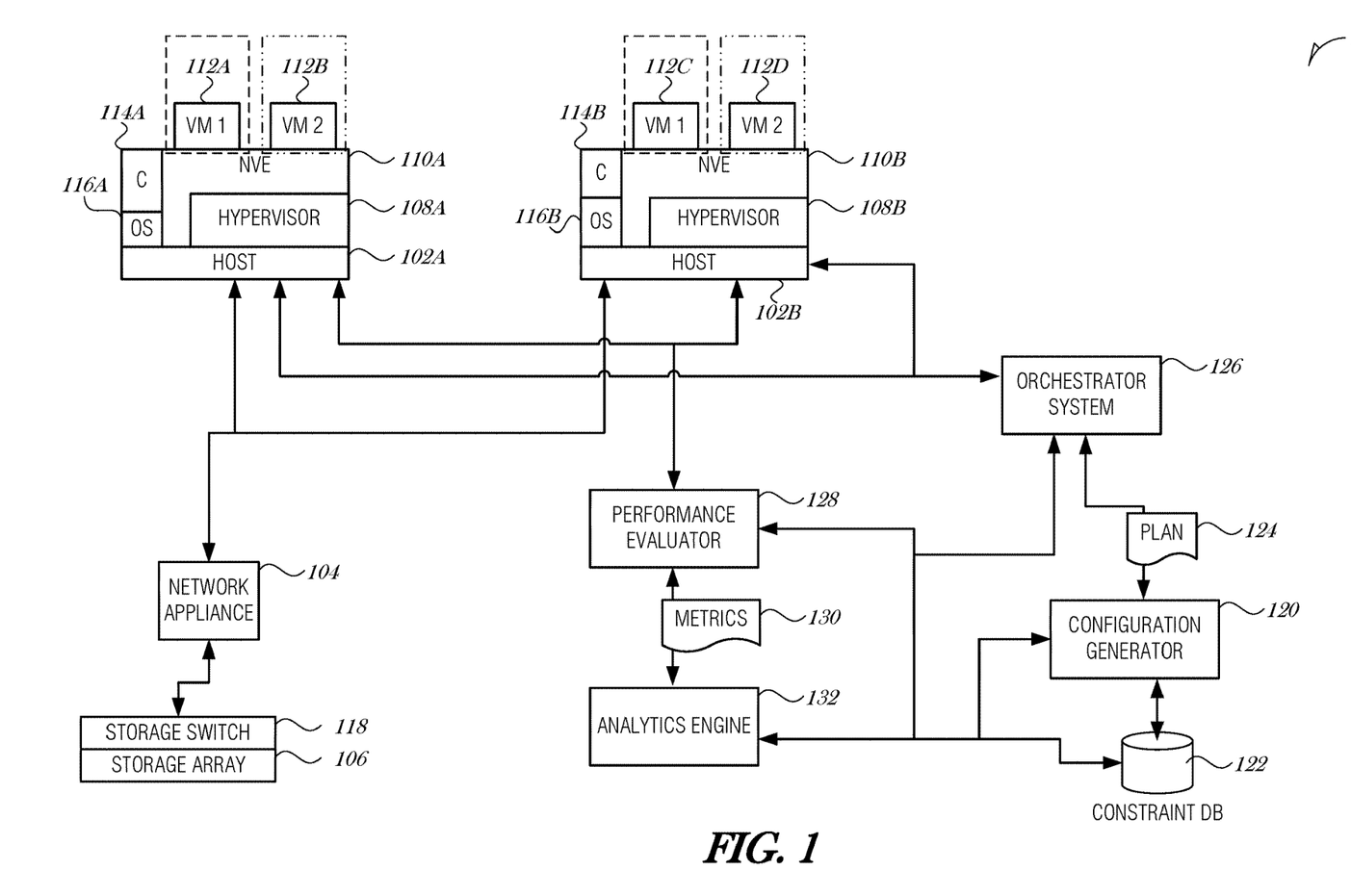
FIG. 1 is a schematic diagram illustrating an operating environment, according to an embodiment.

FIG. 1 is a block diagram illustrating an operating environment 100, according to an embodiment. The operating environment 100 includes two hosts 102A-B (collectively referred to as 102), which are connected via a network appliance 104 to a storage array 106. The hosts 102 execute hypervisors 108A-B (collectively referred to as 108). Hypervisors 108 are an example of a virtualization infrastructure. The hypervisors 108 run on physical infrastructure (e.g., hosts 102), which include processors, memory, communication circuitry, and the like.

Hypervisors 108 provide network virtualized edges (NVE) 110A-B (collectively referred to as 110). NVEs 110 provide a switching interface for virtual machines (VM) 112A-D (collectively referred to as 112). An NVE 110 is a virtualized network stack that works with the hypervisor 108 to provide virtualized network functionality. The NVE 110 is located in each host 102 and collaborates with the respective hypervisor 108 to encapsulate and decapsulate packets for the VM 112/container 114 in the virtual network.

Hosts 102 may also implement containers 114A-B (collectively referred to as 114) alongside VMs 112 or instead of VMs 112. Containers 114 are lightweight virtualized functions that operate on the host operating system (OS) 116A-B (collectively referred to as 116), optionally through a container interface (e.g., a container engine) (not shown). The container interface may be a container platform or container daemon, such as Docker Engine by Docker Inc. The containers 114 may provide similar functions as NVEs 110.

VMs 112 and containers 114 may be used in a virtualized network, where instead of using the host's storage, the VMs 112 and containers 114 use network storage via one or more network file sharing (NFS) protocols. Various NFS protocols may be used, including but not limited to Server Message Block (SMB), Common Internet File System (CIFS) Protocol, Internet Small Computer Systems Interface (ISCSI), or the like.

The network appliance 104 may be any type of switch, router, hub, or other networking hardware. The network appliance 104 connects the hosts 102 with the storage array 106 via a storage switch 118 (collectively referred to as 118). A storage switch 118 is a switch put in front of the storage array 106 or inside the storage array 106 to make the storage products aware of the virtual network. If the storage switch 118 is put in front of the storage array 106, it may be referred to as a "gateway" switch. If the storage switch 118 is put in the storage array 106, it may be referred to as an "embedded" switch. The storage switch 118 may be software or hardware based, or some combination thereof. There is no intrinsic difference between software and hardware in aspects of functionality, but only difference in management, performance, flexibility, etc.

Hosts 102 and storage arrays 106 are connected in the physical network, which means that they may naturally communicate with each over the physical network, assuming there are no access controls. With overlay network virtualization techniques, different tenants may be separated into different virtual networks. For instance, VM1 112A and VM3 112C are in the same virtual network; VM2 112B and VM4 112D are in another virtual network (as depicted by the different dashed boxes around each group). To achieve this, each hypervisor 108 in the host 102 is equipped with an NVE 110 switch (may be both software and hardware), which is controlled by a dedicated network controller 118. In this scenario, VMs 112 hosted by the hypervisors 108 are located in different virtual networks, and each VM 112 may request file or block storage service (e.g., NFS/CIFS/ISCSI) from the storage array 106, which means that the storage array 106 is aware of the virtual network.

A configuration generator 120 is used to obtain constraints from a constraint database 122 and generate a configuration plan 124. The configuration plan 124 includes a specific set of constraints derived from constraints in the constraint database 122. Examples of constraints may include the number or range of physical hosts, the number or range of target latency between two resources (e.g., container or VMs), the number or range of bandwidth between two resources (e.g., container or VMs), the locations of resources (e.g., container or VMs), the number or range of VMs or containers per host, or the like. The configuration generator 120 generates multiple configuration plans 124, where each plan is a specific setting for the constraints in the set of constraints to test. The configuration plans 124 vary one or more constraints to exhaustively and systematically test the constraint space.

The configuration plan 124 is provided to an orchestrator 126. The orchestrator 124 is used to manage VMS 112 or containers 114 on the hosts 102. Orchestrators may provide scheduling, monitoring services to monitor for failures, adding or removing resources, service discovery, or other functions. The configuration generator 120 may be incorporated into the orchestrator 126. The orchestrator 126 uses the configuration plan 124 to instantiate one or more VMs 112 or containers 114 to implement a service. The service may be exposed to a unified software application even though the service may be implemented by several VMs 112 or containers 114 that are instantiated on one host 102 or across several hosts 102. Hosts 102 may be co-located in the same data center or distributed across several data centers.

After the service is installed by instantiating the appropriate VMs 112 or containers 114, a performance evaluator 128 tests the performance of the service. In an example, the performance evaluator 128 uses a special uniform resource locator (URL) or a uniform resource identifier (URI) to access the service and obtain performance metrics 130. The performance metrics 130 are provided to an analytics engine 132. The analytics engine 132 stores the performance metrics 130 and analyzes the performance metrics 130 in view of the constraints provided in the configuration plan 124. The results may be used as a feedback mechanism to the configuration generator 120 or orchestrator system 126. For instance, the orchestrator system 126 may adjust the behaviors, locations, number of, or other aspects of VMs 112 or containers 114 to improve performance. The performance evaluator 128 may be incorporated into the orchestrator system 126. Similarly, the analytics engine 132 may be incorporated into the orchestrator system 126.

The orchestrator system 126, performance evaluator 128, analytics engine 132, and configuration generator 120 may be disposed in a heterogeneous network of connectivity comprising a combination of wired or wireless technologies. Communication pathways may include any number of wired or wireless technologies, including optical networks, and may be part of a local area network (LAN), a wide area network (WAN), or the Internet. Additionally, such communication links facilitate optical signal paths among elements of the operating environment 100, including the use of MUXing/deMUXing components that facilitate interconnection of the various devices.

The network topology used in the operating environment 100 may include any number of types of Internet-of-Things (IoT) networks, such as a mesh network provided with a network using Bluetooth low energy (BLE) links. Other types of IoT networks that may be present include a wireless local area network (WLAN) network used to communicate with devices through IEEE 802.11 (Wi-Fi®) links 128, a cellular network used to communicate with devices through a Long-Term Evolution (LTE/LTE-A) (4G) or 5G cellular network, and a low-power wide area (LPWA) network, for example, a LPWA network compatible with the LoRaWan specification promulgated by the LoRa alliance, or an Internet Protocol version 6 (IPv6) over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective networks may also be integrated with coordinator devices that provide a chain of links that forms cluster tree of linked devices and networks.

Given the variety of types of applicable communications from a device to another component or network, applicable communications circuitry used by the device may include or be embodied by any one or more of components. Accordingly, in various examples, applicable means for communicating (e.g., receiving, transmitting, etc.) may be embodied by such communications circuitry.

The wired or wireless networks may be used to provide remote management of the orchestrator system 126, performance evaluator 128, analytics engine 132, or configuration generator 120. Additionally, the constraint database 122 may be managed remotely using such networks.

Figure 2:
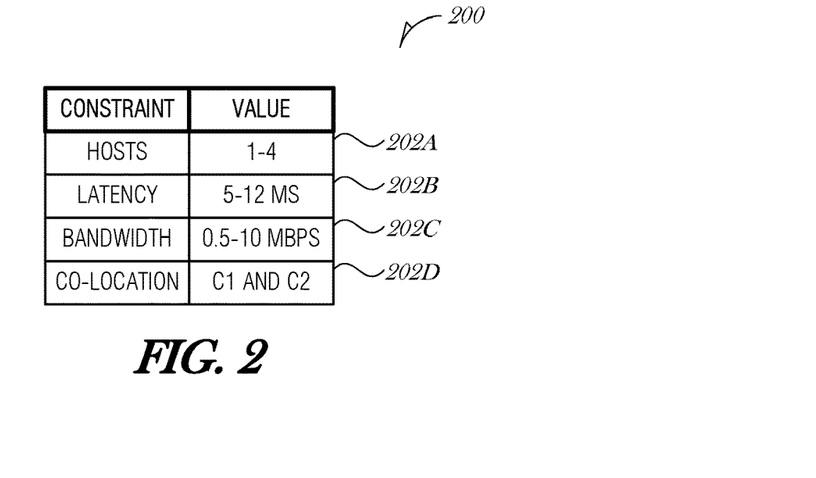
FIG. 2 is a table illustrating a constraint table for a service, according to an embodiment.

FIG. 2 is a table illustrating a constraint table 200 for a service, according to an embodiment. The constraint table 200 may be stored in the constraint database 122. The constraint table 200 may be provided by an administrative user, an end user, a software producer, or other person. It is understood that the constraint table 200 illustrated in FIG. 2 is merely an example and that more or fewer constraints may be provided in any given table.

The constraint table 200 includes the following constraints 202: a range of physical hosts 202A, a range of latency between two containers or VMs 202B, a range of bandwidth provided between two containers or VMs 202C, and a restriction on specific containers or VMs that must be co-located on the same host 202D.

In the example shown, the number of hosts 202A is from one to four, the latency between any two containers or VMs 202B is from 5-12 ms, the range of bandwidth is from 0.5 to 10 Mbit/s (mpbs), and the specific restriction is that container 1 ("C1") and container 2 ("C2") must be on the same physical host. In this example, the service is instantiated using four containers (C1, C2, C3, and C4).

Figure 3:
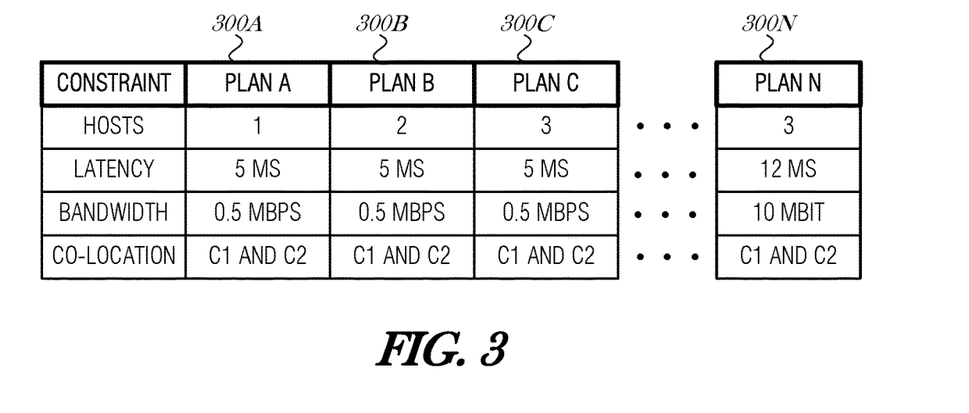
FIG. 3 illustrates an example of parameters used in a series of configuration plans during a configuration search for a service, according to an embodiment.

FIG. 3 illustrates an example of parameters used in a series of configuration plans during a configuration search for a service, according to an embodiment. In an example, each constraint 202A-D is used in various permutations to determine the settings for the constraints 202A-D that produce optimal performance.

To begin, the constraint table 200 is scanned to determine whether there are any specific restrictions. In this case, containers C1 and C2 are specified to be co-located on the same physical host. The number of containers is identified. In this case, as discussed above, there are four containers (C1, C2, C3, and C4). The number of hosts are also identified. Here, there are a maximum of four hosts needed (e.g., one for each container), but with the restriction of co-locating containers C1 and C2, a maximum of three hosts would ever be used. Hosts H1, H2, and H3 are identified from cloud resources (e.g., in a data center or across several data centers). The hosts may be identified from a pool of hosts based on access restrictions for the container or service, available compute resources, geographical location, or other aspects. In any case, three physical hosts are assigned to the labels H1, H2, and H3.

The testing may begin with the first configuration plan 300A, which provides for one host H1, latency of 5 ms, and bandwidth of 0.5 mbps. The next configuration plan 300B may vary one of the constraints while leaving the other constraints constant. Thus, configuration plan 300B increases the number of hosts from one to two, using both H1 and H2, and re-uses the latency and bandwidth values from configuration plan 300A. Similarly, the next configuration plan 300C may increase the hosts to three.

The plans may continue in varying the constraints to systematically or exhaustively search the constraint space. For instance, the next plan may return the hosts value to one and increase latency from 5 ms to 5.5 ms. The latency may be adjusted alone or in combination with other constraints.

The plans 300A-N are used by the orchestrator system 126 to configure and instantiate the containers C1, C2, C3, and C4. The performance evaluator 128 may execute a command, make a request, or otherwise perform a test of the service's response time when configured in each of the various plans. For instance, the performance evaluator 128 may perform a function by making a request to a publicly-exposed container, where the function involves use of every container in the service in order to fully test the responsiveness of the instantiation. This test may be performed on a development (e.g., test) environment or in a live (e.g., production) environment. Analytics are gathers on the execution of a service in a particular configuration and results are provided to an end user (e.g., administrative user), the orchestration system 126, or other components of the operating environment 100.

It is understood that other search algorithms may be used to search the constraint space. FIG. 3 illustrates merely one example search progression. For instance, if a configuration plan search direction appears to be reducing the performance of the service, then the configuration plans may be abandoned to avoid searching the constraint permutations in that space. For instance, if increasing the number of hosts from two to three consistently reduces the service's performance, then later tests may omit permutations that use three hosts. Similarly, if a configuration plan search direction appears to have no further effect on increasing performance, then the configuration plans may be omitted or abandoned to reduce the search space. For instance, if increasing the bandwidth from 6 mpbs to 6.5 mpbs does not provide any faster response times (e.g., because the service is processor bound, not data path bound), then permutations that use 6.5 mpbs and higher may be omitted from any further evaluation.

Figure 4:
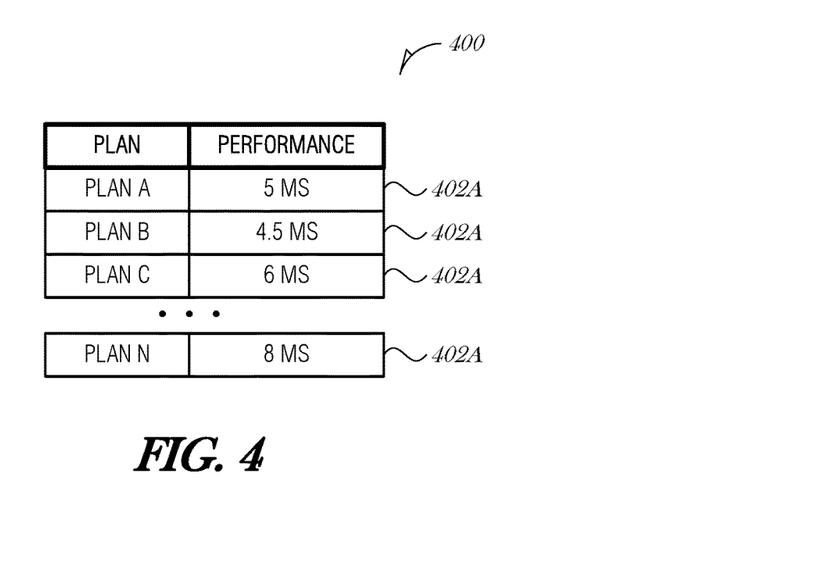
FIG. 4 is an example performance data table, according to an embodiment.

FIG. 4 is an example performance data table 400, according to an embodiment. The performance data table 400 includes the constraints 202A-D used in a particular configuration plan 300A-N and a resulting performance metric 402A-N. The performance metric 402A-N may be time to complete a request or obtain a response from a service. It is understood that not every configuration plan 300A-N may be tested and as a result, the performance data table 400 may have fewer rows than there are plans 300A-N. Based on the testing, an optimal configuration plan is identified.

Figure 5:
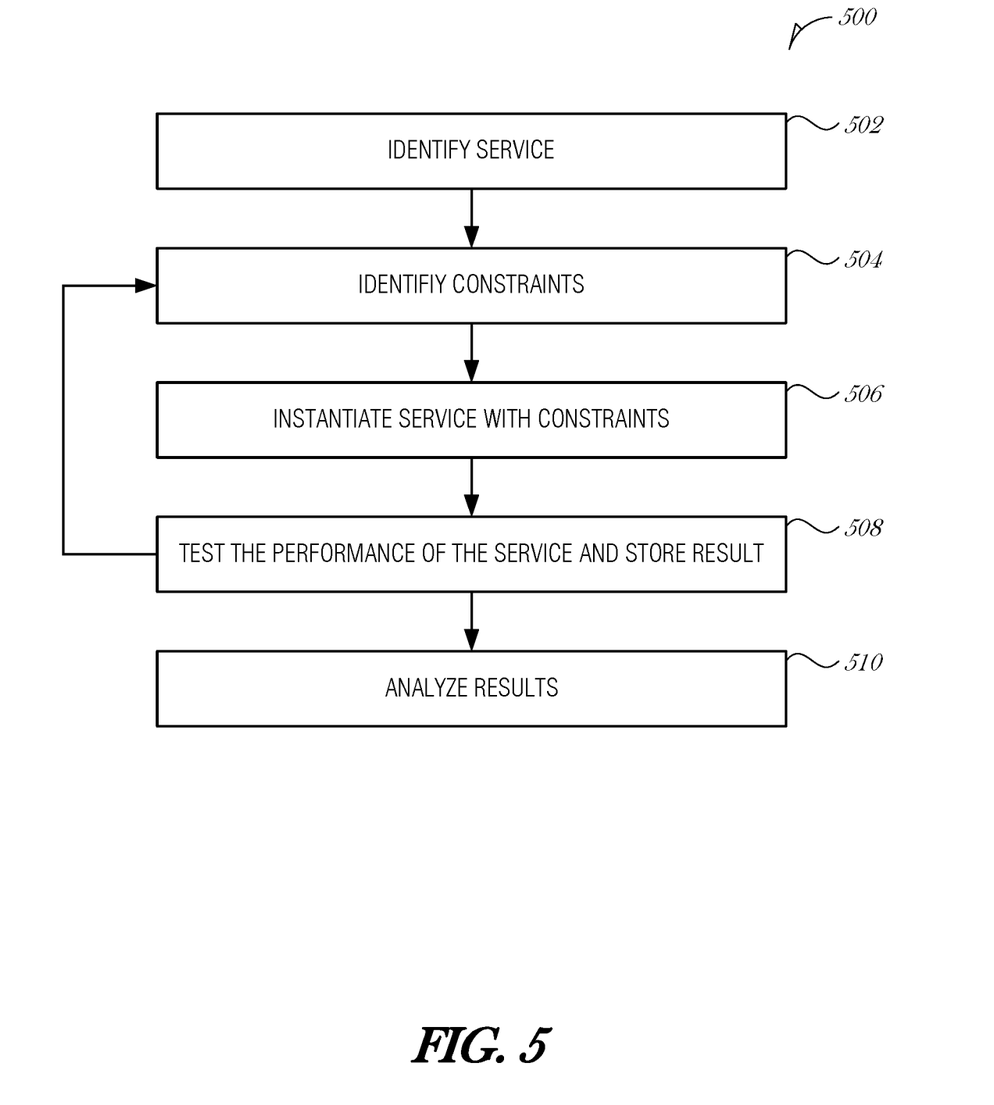
FIG. 5 is a flowchart illustrating a method for identifying an optimal configuration plan, according to an embodiment.

FIG. 5 is a flowchart illustrating a method 500 for identifying an optimal configuration plan, according to an embodiment. At 502, a service for deployment is identified. The service may be destined for a cloud deployment and may include two or more containers or VMs. At 504, the constraints and their ranges, permissible values, or other restrictions are identified. For each configuration plan, the orchestrator system instantiates the service with the configuration plan, which represents a variation of constraints (operation 506). The performance monitor tests the performance of the service and stores the result (operation 508). A test may include executing a performance URL to access the server several times and combining the results. For instance, the performance URL may be loaded ten times and the results averaged to obtain an average performance metric. The average performance metric may be stored for future comparisons. The average performance metric may be calculated by the performance monitor or by an analytics engine. Successive configuration plans are instantiated and tested (operations 504-508), until all of the possible constraint combinations are evaluated. At 510, the analytics engine identifies the configuration plan that produced the best performance.

Figure 6:
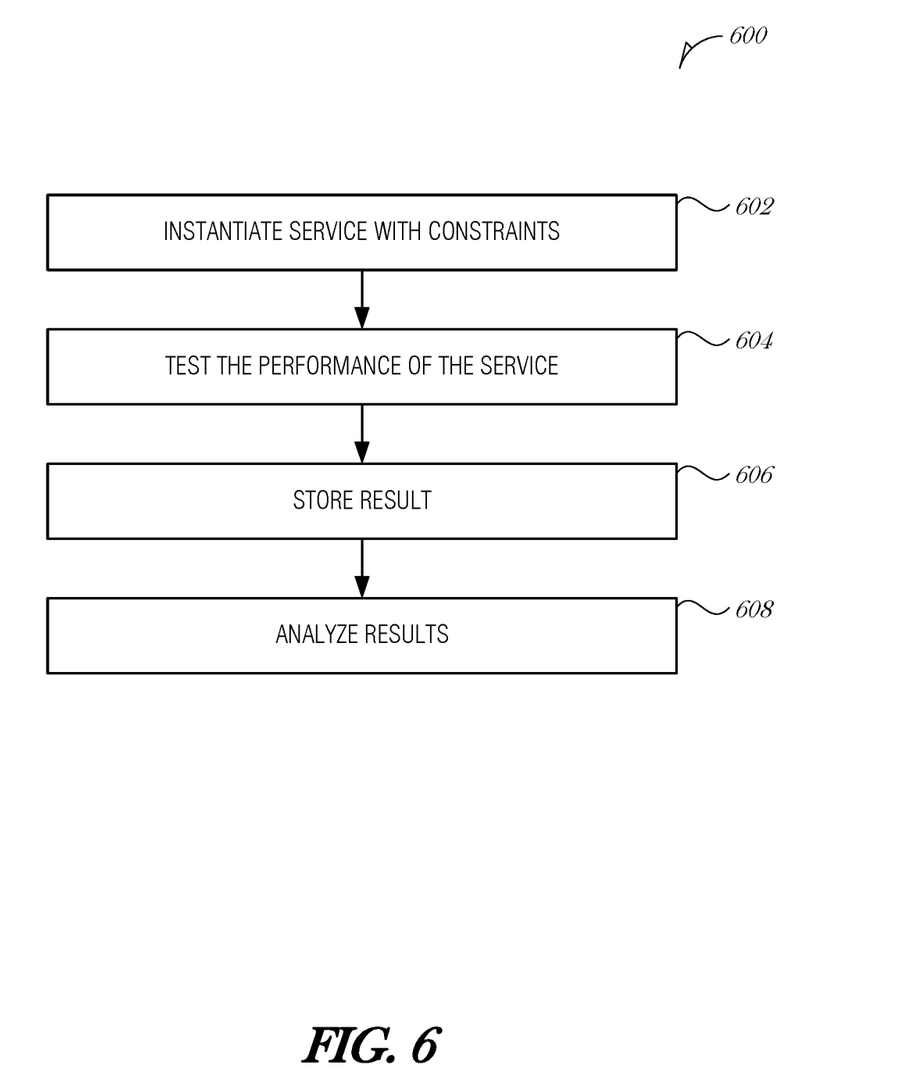
FIG. 6 is a flowchart illustrating a method for monitoring an instantiation of a service, according to an embodiment.

FIG. 6 is a flowchart illustrating a method 600 for monitoring an instantiation of a service, according to an embodiment. At 602, the service is instantiated by the orchestrator system using a configuration plan. The performance monitor tests the performance of the service, such as by using a performance URL (operation 604). The constraints and the corresponding performance are stored (e.g., in performance data table 400), which documents the performance of the service (operation 606). This operation 606 is periodically re-executed to obtain ongoing performance metrics. Each test may be stored and timestamped. A test may include executing the performance URL several times and combining the results. For instance, the performance URL may be accessed or executed multiple times and the results averaged to obtain an average performance metric. The average performance metric may be stored for future comparisons. If an instantiation of the service changes, such as a host going down, the new performance data is captured in the table. At 608, the analytics engine reviews the performance data to determine if there are performance increases or degradations. For instance, if a host fails, the container may be moved to another host, which was not part of the original search. If the performance increases with the new host, then that configuration plan is captured as being potentially more optimal than the previously-identified optimal plan.

Figure 7:
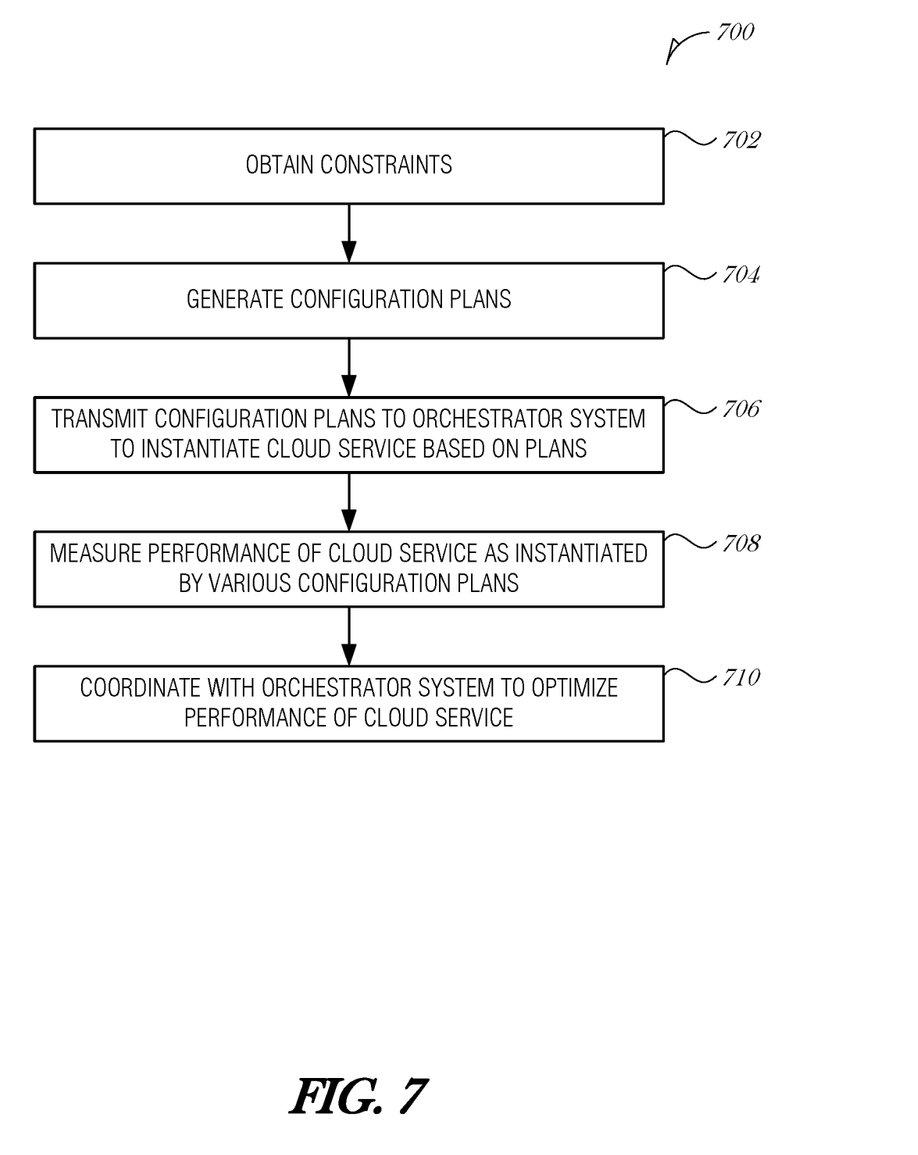
FIG. 7 is a flowchart illustrating a method for managing a cloud deployed service, according to an embodiment.

FIG. 7 is a flowchart illustrating a method 700 for managing a cloud deployed service, according to an embodiment. At 702, a plurality of constraints are obtained from a constraint database.

At 704, a plurality of configuration plans are generated, with each of the plurality of configuration plans including the plurality of constraints, and each of the plurality of constraints having a value selected from a range of permissible values for the respective constraint.

In an embodiment, the plurality of constraints include a number of allowable physical hosts to host the cloud service. In a related embodiment, the plurality of constraints include a latency between a first virtualized resource and a second virtualized resource. In other embodiments, the plurality of constraints include a bandwidth between a first virtualized resource and a second virtualized resource, or the plurality of constraints include a restriction on co-location of a first virtualized resource and a second virtualized resource.

At 706, the plurality of configuration plans are transmitted to an orchestrator system, where the orchestrator system is to sequentially instantiate a cloud service based on multiple configuration plans of the plurality of configuration plans.

In an embodiment, the cloud service is implemented using a first virtualized resource and a second virtualized resource. In a further embodiment, the first virtualized resource is a virtual machine. In other embodiments, the first virtualized resource is a container, the second virtualized resource is a virtual machine, or the second virtualized resource is a container.

At 708, a performance metric of the cloud service as instantiated by each of the multiple configuration plans is measured by a performance evaluator. In an embodiment, measuring the performance metric of the cloud service comprises measuring a response time of the cloud service. In a related embodiment, measuring the performance metric of the cloud service comprises accessing a uniform resource locator of the cloud service. In another embodiment, measuring the performance metric of the cloud service comprises accessing a uniform resource locator of the cloud service multiple times to obtain a plurality of intermediate performance metrics, and aggregating the plurality of intermediate performance metrics to obtain the performance metric. In a further embodiment, aggregating the plurality of intermediate performance metrics comprises calculating an average of the plurality of intermediate performance metrics to obtain the performance metric.

At 710, the performance evaluator coordinates with the orchestrator system to optimize the performance of the cloud service.

In an embodiment, coordinating with the orchestrator system comprises: providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service. In a further embodiment, coordinating with the orchestrator also includes: receiving an indication from the orchestrator system of a change to the optimally instantiated cloud service; measuring an updated performance metric of the optimally instantiated cloud service; and providing the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
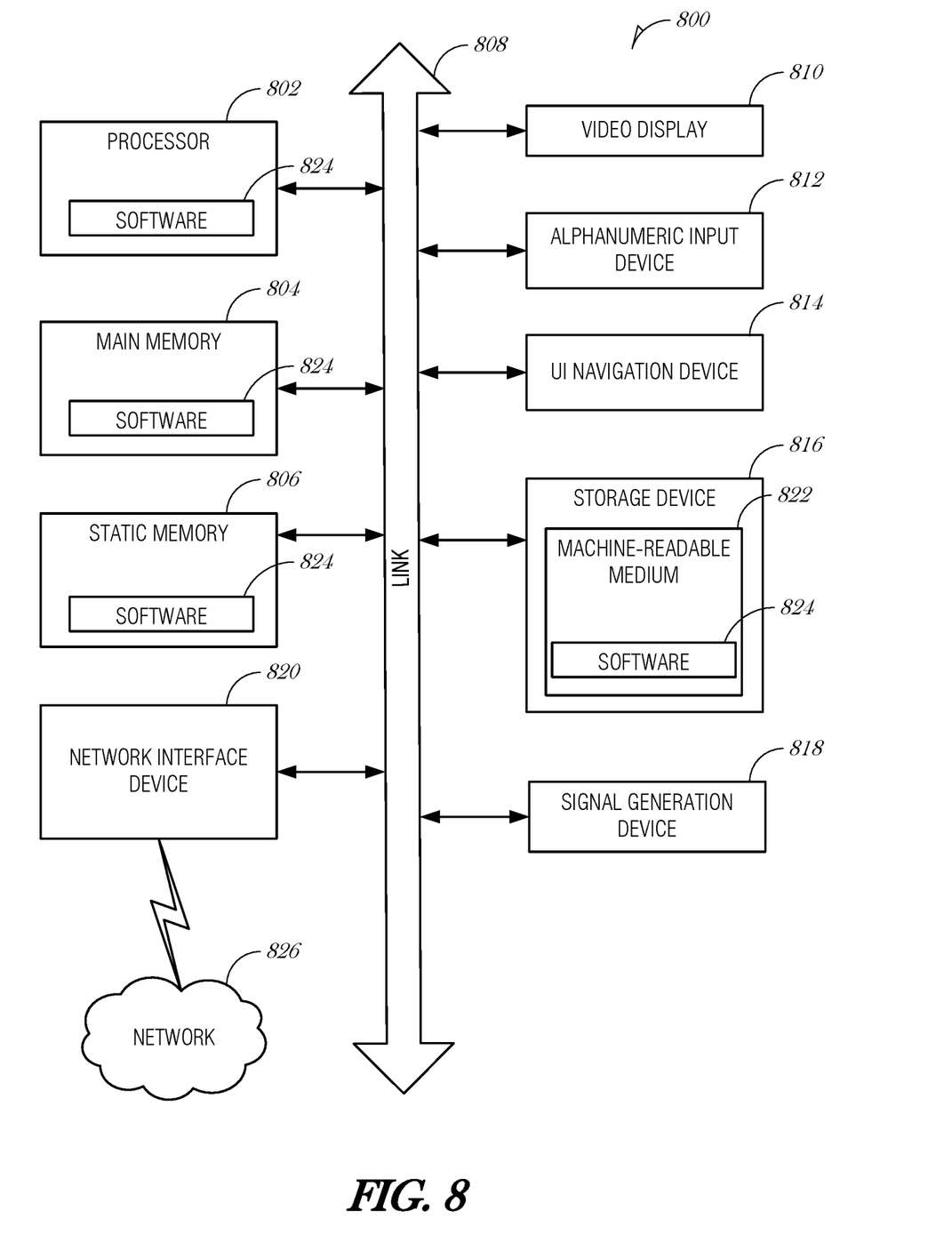
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., Hypertext Transport Protocol (HTTP)). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or Worldwide Interoperability for Microwave Access (WiMAX) networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for managing a cloud deployed service, the system comprising: a configuration generator to: obtain a plurality of constraints from a constraint database; generate a plurality of configuration plans, each of the plurality of configuration plans including the plurality of constraints, each of the plurality of constraints having a value selected from a range of permissible values for the respective constraint; and transmit the plurality of configuration plans to an orchestrator system, the orchestrator system to sequentially instantiate a cloud service based on multiple configuration plans of the plurality of configuration plans; and a performance evaluator to: measure a performance metric of the cloud service as instantiated by each of the multiple configuration plans; and coordinate with the orchestrator system to optimize the performance of the cloud service.

In Example 2, the subject matter of Example 1 includes, wherein the cloud service is implemented using a first virtualized resource and a second virtualized resource.

In Example 3, the subject matter of Example 2 includes, wherein the first virtualized resource is a virtual machine.

In Example 4, the subject matter of Examples 2-3 includes, wherein the first virtualized resource is a container.

In Example 5, the subject matter of Examples 2-4 includes, wherein the second virtualized resource is a virtual machine.

In Example 6, the subject matter of Examples 2-5 includes, wherein the second virtualized resource is a container.

In Example 7, the subject matter of Examples 1-6 includes, wherein the plurality of constraints include a number of allowable physical hosts to host the cloud service.

In Example 8, the subject matter of Examples 1-7 includes, wherein the plurality of constraints include a latency between a first virtualized resource and a second virtualized resource.

In Example 9, the subject matter of Examples 1-8 includes, wherein the plurality of constraints include a bandwidth between a first virtualized resource and a second virtualized resource.

In Example 10, the subject matter of Examples 1-9 includes, wherein the plurality of constraints include a restriction on co-location of a first virtualized resource and a second virtualized resource.

In Example 11, the subject matter of Examples 1-10 includes, wherein to measure the performance metric of the cloud service, the performance evaluator is to measure a response time of the cloud service.

In Example 12, the subject matter of Examples 1-11 includes, wherein to measure the performance metric of the cloud service, the performance evaluator is to access a uniform resource locator of the cloud service.

In Example 13, the subject matter of Examples 1-12 includes, wherein to measure the performance metric of the cloud service, the performance evaluator is to access a uniform resource locator of the cloud service multiple times to obtain a plurality of intermediate performance metrics, and aggregate the plurality of intermediate performance metrics to obtain the performance metric.

In Example 14, the subject matter of Example 13 includes, wherein to aggregate the plurality of intermediate performance metrics, the performance evaluator is to calculate an average of the plurality of intermediate performance metrics to obtain the performance metric.

In Example 15, the subject matter of Examples 1-14 includes, wherein to coordinate with the orchestrator system, the performance evaluator is to: provide the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service.

In Example 16, the subject matter of Example 15 includes, wherein to coordinate with the orchestrator, the performance evaluator is to: receive an indication from the orchestrator system of a change to the optimally instantiated cloud service; measure an updated performance metric of the optimally instantiated cloud service; and provide the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

Example 17 is a method of managing a cloud deployed service, the method comprising: obtaining a plurality of constraints from a constraint database; generating a plurality of configuration plans, each of the plurality of configuration plans including the plurality of constraints, each of the plurality of constraints having a value selected from a range of permissible values for the respective constraint; transmitting the plurality of configuration plans to an orchestrator system, the orchestrator system to sequentially instantiate a cloud service based on multiple configuration plans of the plurality of configuration plans; measuring a performance metric of the cloud service as instantiated by each of the multiple configuration plans by a performance evaluator; and coordinating, by the performance evaluator, with the orchestrator system to optimize the performance of the cloud service.

In Example 18, the subject matter of Example 17 includes, wherein the cloud service is implemented using a first virtualized resource and a second virtualized resource.

In Example 19, the subject matter of Example 18 includes, wherein the first virtualized resource is a virtual machine.

In Example 20, the subject matter of Examples 18-19 includes, wherein the first virtualized resource is a container.

In Example 21, the subject matter of Examples 18-20 includes, wherein the second virtualized resource is a virtual machine.

In Example 22, the subject matter of Examples 18-21 includes, wherein the second virtualized resource is a container.

In Example 23, the subject matter of Examples 17-22 includes, wherein the plurality of constraints include a number of allowable physical hosts to host the cloud service.

In Example 24, the subject matter of Examples 17-23 includes, wherein the plurality of constraints include a latency between a first virtualized resource and a second virtualized resource.

In Example 25, the subject matter of Examples 17-24 includes, wherein the plurality of constraints include a bandwidth between a first virtualized resource and a second virtualized resource.

In Example 26, the subject matter of Examples 17-25 includes, wherein the plurality of constraints include a restriction on co-location of a first virtualized resource and a second virtualized resource.

In Example 27, the subject matter of Examples 17-26 includes, wherein measuring the performance metric of the cloud service comprises measuring a response time of the cloud service.

In Example 28, the subject matter of Examples 17-27 includes, wherein measuring the performance metric of the cloud service comprises accessing a uniform resource locator of the cloud service.

In Example 29, the subject matter of Examples 17-28 includes, wherein measuring the performance metric of the cloud service comprises accessing a uniform resource locator of the cloud service multiple times to obtain a plurality of intermediate performance metrics, and aggregating the plurality of intermediate performance metrics to obtain the performance metric.

In Example 30, the subject matter of Example 29 includes, wherein aggregating the plurality of intermediate performance metrics comprises calculating an average of the plurality of intermediate performance metrics to obtain the performance metric.

In Example 31, the subject matter of Examples 17-30 includes, wherein coordinating with the orchestrator system comprises: providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service.

In Example 32, the subject matter of Example 31 includes, wherein coordinating with the orchestrator comprises: receiving an indication from the orchestrator system of a change to the optimally instantiated cloud service; measuring an updated performance metric of the optimally instantiated cloud service; and providing the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is an apparatus for managing a cloud deployed service, the apparatus comprising: means for obtaining a plurality of constraints from a constraint database; means for generating a plurality of configuration plans, each of the plurality of configuration plans including the plurality of constraints, each of the plurality of constraints having a value selected from a range of permissible values for the respective constraint; means for transmitting the plurality of configuration plans to an orchestrator system, the orchestrator system to sequentially instantiate a cloud service based on multiple configuration plans of the plurality of configuration plans; means for measuring a performance metric of the cloud service as instantiated by each of the multiple configuration plans; and means for coordinating with the orchestrator system to optimize the performance of the cloud service.

For instance, means for obtaining the plurality of constraints, means for generating a plurality of configuration plans, and means for transmitting the plurality of configuration plans to an orchestrator system may include implementation of the configuration generator 120. Additionally, means for measuring a performance metric of the cloud service as instantiated by each of the multiple configuration plans and means for coordinating with the orchestrator system to optimize the performance of the cloud service may include implementation of the performance evaluator 128.

In Example 36, the subject matter of Example 35 includes, wherein the cloud service is implemented using a first virtualized resource and a second virtualized resource.

In Example 37, the subject matter of Example 36 includes, wherein the first virtualized resource is a virtual machine.

In Example 38, the subject matter of Examples 36-37 includes, wherein the first virtualized resource is a container.

In Example 39, the subject matter of Examples 36-38 includes, wherein the second virtualized resource is a virtual machine.

In Example 40, the subject matter of Examples 36-39 includes, wherein the second virtualized resource is a container.

In Example 41, the subject matter of Examples 35-40 includes, wherein the plurality of constraints include a number of allowable physical hosts to host the cloud service.

In Example 42, the subject matter of Examples 35-41 includes, wherein the plurality of constraints include a latency between a first virtualized resource and a second virtualized resource.

In Example 43, the subject matter of Examples 35-42 includes, wherein the plurality of constraints include a bandwidth between a first virtualized resource and a second virtualized resource.

In Example 44, the subject matter of Examples 35-43 includes, wherein the plurality of constraints include a restriction on co-location of a first virtualized resource and a second virtualized resource.

In Example 45, the subject matter of Examples 35-44 includes, wherein measuring the performance metric of the cloud service comprises measuring a response time of the cloud service.

In Example 46, the subject matter of Examples 35-45 includes, wherein the means for measuring the performance metric of the cloud service comprise means for accessing a uniform resource locator of the cloud service.

In Example 47, the subject matter of Examples 35-46 includes, wherein the means for measuring the performance metric of the cloud service comprise means for accessing a uniform resource locator of the cloud service multiple times to obtain a plurality of intermediate performance metrics, and aggregating the plurality of intermediate performance metrics to obtain the performance metric.

In Example 48, the subject matter of Example 47 includes, wherein the means for aggregating the plurality of intermediate performance metrics comprise means for calculating an average of the plurality of intermediate performance metrics to obtain the performance metric.

In Example 49, the subject matter of Examples 35-48 includes, wherein the means for coordinating with the orchestrator system comprises: means for providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service.

In Example 50, the subject matter of Example 49 includes, wherein the means for coordinating with the orchestrator comprises: means for receiving an indication from the orchestrator system of a change to the optimally instantiated cloud service; means for measuring an updated performance metric of the optimally instantiated cloud service; and means for providing the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

Example 51 is at least one machine-readable medium including instructions for managing a cloud deployed service, which when executed by a machine, cause the machine to perform the operations comprising: obtaining a plurality of constraints from a constraint database; generating a plurality of configuration plans, each of the plurality of configuration plans including the plurality of constraints, each of the plurality of constraints having a value selected from a range of permissible values for the respective constraint; transmitting the plurality of configuration plans to an orchestrator system, the orchestrator system to sequentially instantiate a cloud service based on multiple configuration plans of the plurality of configuration plans; measuring a performance metric of the cloud service as instantiated by each of the multiple configuration plans; and coordinating with the orchestrator system to optimize the performance of the cloud service.

In Example 52, the subject matter of Example 51 includes, wherein the cloud service is implemented using a first virtualized resource and a second virtualized resource.

In Example 53, the subject matter of Example 52 includes, wherein the first virtualized resource is a virtual machine.

In Example 54, the subject matter of Examples 52-53 includes, wherein the first virtualized resource is a container.

In Example 55, the subject matter of Examples 52-54 includes, wherein the second virtualized resource is a virtual machine.

In Example 56, the subject matter of Examples 52-55 includes, wherein the second virtualized resource is a container.

In Example 57, the subject matter of Examples 51-56 includes, wherein the plurality of constraints include a number of allowable physical hosts to host the cloud service.

In Example 58, the subject matter of Examples 51-57 includes, wherein the plurality of constraints include a latency between a first virtualized resource and a second virtualized resource.

In Example 59, the subject matter of Examples 51-58 includes, wherein the plurality of constraints include a bandwidth between a first virtualized resource and a second virtualized resource.

In Example 60, the subject matter of Examples 51-59 includes, wherein the plurality of constraints include a restriction on co-location of a first virtualized resource and a second virtualized resource.

In Example 61, the subject matter of Examples 51-60 includes, wherein measuring the performance metric of the cloud service comprises measuring a response time of the cloud service.

In Example 62, the subject matter of Examples 51-61 includes, wherein measuring the performance metric of the cloud service comprises accessing a uniform resource locator of the cloud service.

In Example 63, the subject matter of Examples 51-62 includes, wherein measuring the performance metric of the cloud service comprises accessing a uniform resource locator of the cloud service multiple times to obtain a plurality of intermediate performance metrics, and aggregating the plurality of intermediate performance metrics to obtain the performance metric.

In Example 64, the subject matter of Example 63 includes, wherein aggregating the plurality of intermediate performance metrics comprises calculating an average of the plurality of intermediate performance metrics to obtain the performance metric.

In Example 65, the subject matter of Examples 51-64 includes, wherein coordinating with the orchestrator system comprises: providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service.

In Example 66, the subject matter of Example 65 includes, wherein coordinating with the orchestrator comprises: receiving an indication from the orchestrator system of a change to the optimally instantiated cloud service; measuring an updated performance metric of the optimally instantiated cloud service; and providing the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

Example 67 is at least one machine-readable medium including instructions that, when executed by processing circuitry, cause the processing circuitry to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing a cloud deployed service, the system comprising:
a processor subsystem; and
a memory device including instructions embodied thereon, wherein the instructions, which when executed by the processor subsystem, configure the processor subsystem to implement:
a configuration generator to:
obtain a plurality of constraints from a constraint database;
generate a plurality of configuration plans, each of the plurality of configuration plans including the plurality of constraints, each of the plurality of constraints having a value selected from a range of permissible values for the respective constraint; and
transmit the plurality of configuration plans to an orchestrator system, the orchestrator system to sequentially instantiate a cloud service based on multiple configuration plans of the plurality of configuration plans; and
a performance evaluator to:
measure a performance metric of the cloud service as instantiated by each of the multiple configuration plans; and
coordinate with the orchestrator system to optimize the performance of the cloud service, wherein to coordinate with the orchestrator system, the performance evaluator is to:
provide the performance metric of the cloud service as instantiated by, each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service;
receive an indication from the orchestrator system of a change to the optimally instantiated cloud service,
measure an updated performance metric of the optimally instantiated cloud service; and
provide the updated performance metric of the optimally instantiated cloud service to the analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

2. The system of claim 1, wherein the cloud service is implemented using a first virtualized resource and a second virtualized resource.

3. The system of claim 2, wherein the first virtualized resource is a virtual machine.

4. The system of claim 2, wherein the first virtualized resource is a container.

5. The system of claim 1, wherein the plurality of constraints include a number of allowable physical hosts to host the cloud service.

6. The system of claim 1, wherein the plurality of constraints include a latency between a first virtualized resource and a second virtualized resource.

7. The system of claim 1, wherein the plurality of constraints include a bandwidth between a first virtualized resource and a second virtualized resource.

8. The system of claim 1, wherein the plurality of constraints include a restriction on co-location of a first virtualized resource and a second virtualized resource.

9. The system of claim 1, wherein to measure the performance metric of the cloud service, the performance evaluator is to measure a response time of the cloud service.

10. The system of claim 1, wherein to measure the performance metric of the cloud service, the performance evaluator is to access a uniform resource locator of the cloud service.

11. The system of claim 1, wherein to measure the performance metric of the cloud service, the performance evaluator is to access a uniform resource locator of the cloud service multiple times to obtain a plurality of intermediate performance metrics, and aggregate the plurality of intermediate performance metrics to obtain the performance metric.

12. The system of claim 11, wherein to aggregate the plurality of intermediate performance metrics, the performance evaluator is to calculate an average of the plurality of intermediate performance metrics to obtain the performance metric.

13. A method of managing a cloud deployed service, the method comprising:
    obtaining a plurality of constraints from a constraint database;
    generating a plurality of configuration plans, each of the plurality of configuration plans including the plurality of constraints, each of the plurality of constraints having a value selected from a range of permissible values for the respective constraint;
    transmitting the plurality of configuration plans to an orchestrator system, the orchestrator system to sequentially instantiate a cloud service based on multiple configuration plans of the plurality of configuration plans;
    measuring a performance metric of the cloud service as instantiated by each of the multiple configuration plans by a performance evaluator; and
    coordinating, by the performance evaluator, with the orchestrator system to optimize the performance of the cloud service,
    wherein coordinating with the orchestrator system comprises:
        providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service;
        receiving an indication from the orchestrator system of a change to the optimally instantiated cloud service;
        measuring an updated performance metric of the optimally instantiated cloud service; and
        providing the updated performance metric of the optimally instantiated cloud service to an analytics engine, the analytics engine to determine whether the change to the optimally instantiated cloud service cause more than a threshold performance impact of the optimally instantiated cloud service, based on the updated performance metric, and the analytics engine to conditionally provide a revised configuration plan to the orchestrator system when the threshold performance impact exists.

14. The method of claim 13, wherein measuring the performance metric of the cloud service comprises accessing a uniform resource locator of the cloud service multiple times to obtain a plurality of intermediate performance metrics, and aggregating the plurality of intermediate performance metrics to obtain the performance metric.

15. The method of claim 14, wherein aggregating the plurality of intermediate performance metrics comprises calculating an average of the plurality of intermediate performance metrics to obtain the performance metric.

16. At least one non-transitory machine-readable medium including instructions for managing a cloud deployed service, which when executed by a machine, cause the machine to perform the operations comprising:
    obtaining a plurality of constraints from a constraint database;
    generating a plurality of configuration plans, each of the plurality of configuration plans including the plurality of constraints, each of the plurality of constraints having a value selected from a range of permissible values for the respective constraint;
    transmitting the plurality of configuration plans to an orchestrator system, the orchestrator system to sequentially instantiate a cloud service based on multiple configuration plans of the plurality of configuration plans;
    measuring a performance metric of the cloud service as instantiated by each of the multiple configuration plans; and
    coordinating with the orchestrator system to optimize the performance of the cloud service,
    wherein coordinating with the orchestrator system comprises:
        providing the performance metric of the cloud service as instantiated by each of the multiple configuration plans to an analytics engine, the analytics engine to determine which of the multiple configuration plans is an optimal configuration plan, and the analytics engine to provide the optimal configuration plan to the orchestrator system to instantiate an optimally instantiated cloud service,
        receiving an indication from the orchestrator system of a change to the optimally instantiated cloud service;
        measuring an updated performance metric of the optimally instantiated cloud service; and
        providing the updated performance metric of the optimally instantiated cloud service to an analytics engine, the analytics engine to determine whether the change to the optimally, instantiated cloud service cause more than a threshold performance impact of the optimally instantiated cloud service, based on the updated performance metric, and the analytics engine to conditionally provide a revised configuration plan to the orchestrator system when the threshold performance impact exists.

* * * * *

UNITED STATES PATENT AND TRADEMARK OFFICE
CERTIFICATE OF CORRECTION

PATENT NO.        : 10,833,933 B2
APPLICATION NO.   : 16/145769
DATED             : November 10, 2020
INVENTOR(S)       : Jeffrey Christopher Sedayao Page 1 of 1

It is certified that error appears in the above-identified patent and that said Letters Patent is hereby corrected as shown below:

In the Claims

In Column 18, Line 31, in Claim 1, delete "by," and insert --by-- therefor

In Column 18, Line 41, in Claim 1, delete "service," and insert --service;-- therefor In Column 20, Line 48, in Claim 16, delete "service," and insert --service;-- therefor In Column 20, Line 56, in Claim 16, delete "optimally," and insert --optimally-- therefor Signed and Sealed this
Ninth Day of February, 2021

Drew Hirshfeld
*Performing the Functions and Duties of the
Under Secretary of Commerce for Intellectual Property and
Director of the United States Patent and Trademark Office*